Patented Sept. 27, 1932

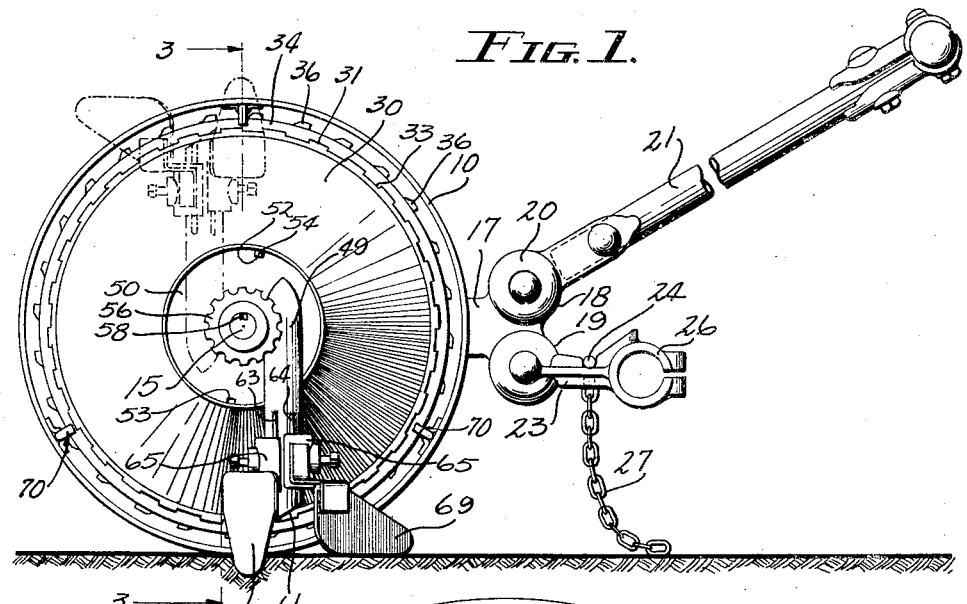
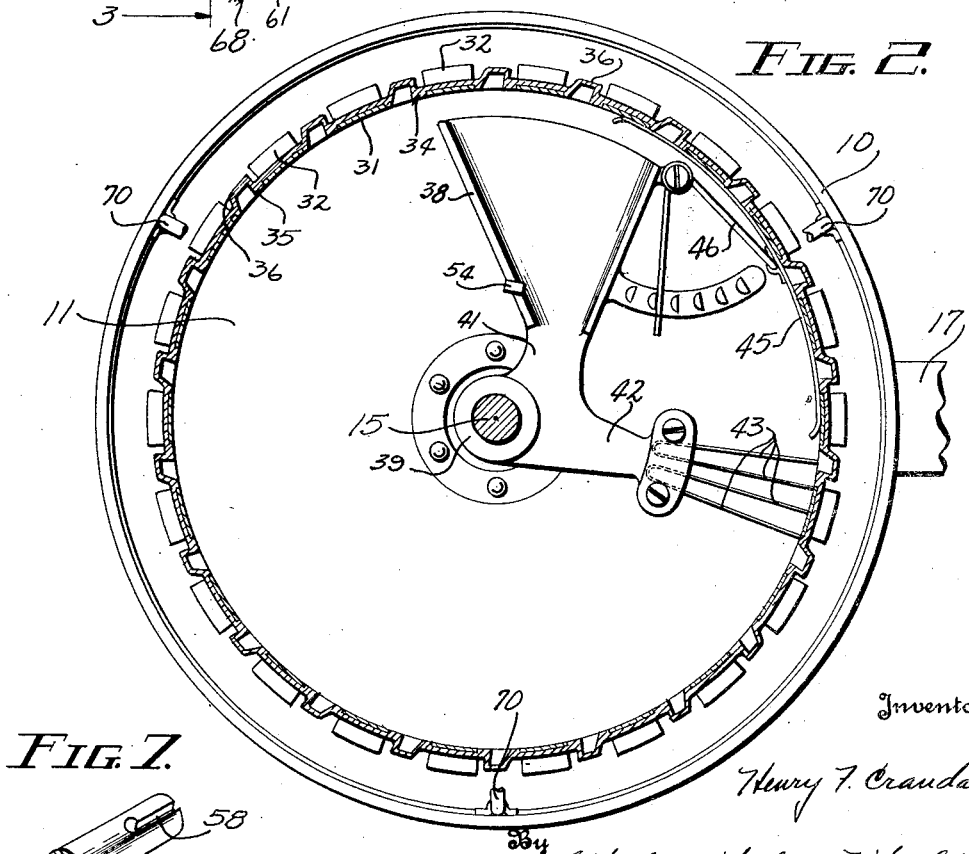

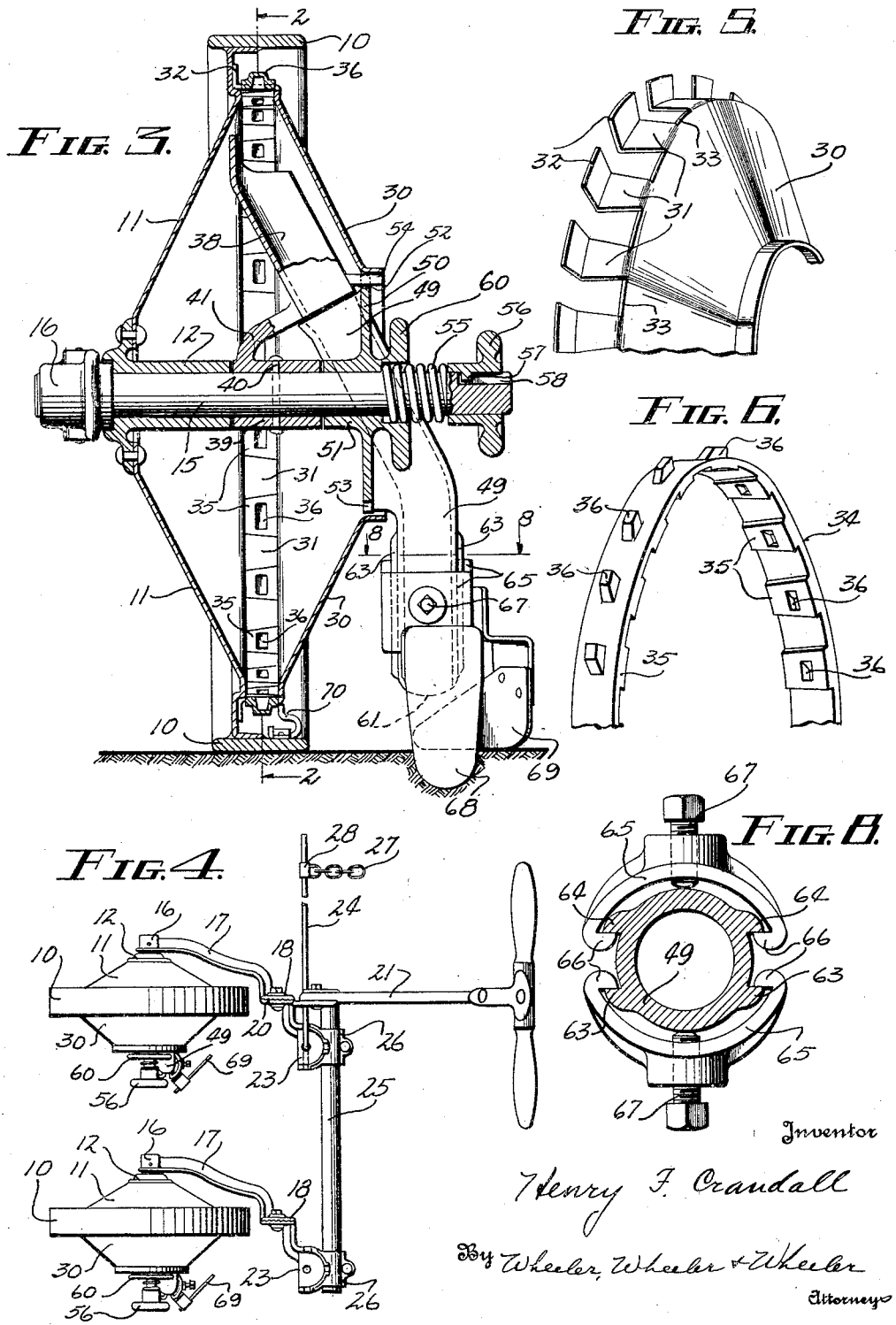

1,879,111

UNITED STATES PATENT OFFICE

HENRY F. CRANDALL, OF SILVER CLIFF, WISCONSIN, ASSIGNOR OF ONE-HALF TO JOHN T. CORR, OF RACINE, WISCONSIN

SEED PLANTER

Application filed July 3, 1930. Serial No. 465,591.

This invention relates to improvements in seed planters.

It is the primary object of this invention to provide a novel and simple seeder which may easily be manipulated manually and which is adapted to plant any desired kind of seed at a uniform depth determined with reference to kind of seed to be planted.

More specifically stated it is my purpose to provide a seed planting device in which a single wheel is built to comprise a drum for seed from which any one of a number of interchangeable seed elevating rings is adapted to elevate seed for discharge to a point in the ground immediately adjacent the point of support of the wheel. It is also my purpose to provide for adjustable connection of a handle with a device of this kind and the adjustable connection of two or more such devices with each other.

I contemplate further an arrangement whereby the seed elevating buckets are applicable to the outside of the seed container with their seed receiving surfaces opening to the inside of the container and coacting therewith to provide a smooth surface. It is contemplated that a shoe may conveniently be used to retain individual seeds in the respective buckets during their elevation to the point of discharge. The exterior application of the seed elevator ring facilitates the interchange of such ring with rings for handling other seeds.

It is my further purpose to provide a novel and improved form of marker; to provide an improved discharge spout, plow and hoe assembly for furrowing, delivering the seed and covering it; to provide an improved type of bucket; to provide an arrangement for rendering the seeder inoperative during transportation; to provide improved means for access to the interior of the seeder; and to provide a unique wheel construction.

In the drawings:

Figure 1 is a side elevation of a device embodying this invention.

Figure 2 is an enlarged view thereof in section in the plane indicated at 2—2 in Fig. 3.

Figure 3 is an enlarged detail view of the Fig. 1 construction in the plane indicated at 3—3 in Fig. 1.

Figure 4 is a plane view on a reduced scale showing the assembly for joint operation of two seeders embodying this invention.

Figure 5 is an enlarged detail in perspective of a fragment of one of the component parts of the wheel.

Figure 6 is a similar view of a coacting interchangeable seed elevating ring.

Figure 7 is a detail view in perspective of the end of the shaft upon which the wheel of the planter turns.

Figure 8 is a detail view in cross section through the discharge pipe and the plow attachment fittings.

Like parts are identified by the same reference characters throughout the several views.

The entire apparatus is supported by a single wheel which constitutes a seed reservoir and elevator. This wheel comprises a rim 10 from which a disk 11 carries hub 12. This hub turns upon an axle 15 which is fixed in the socketed end 16 of an arm 17 which extends about the concave disk 11 and rim 10 to the median plane of the ring. Substantially in that plane the arm 17 is provided with upper and lower serrated faces 18 and 19 respectively. To the upper face a complementary fitting 20 is adapted to be secured for the adjustable connection of handle 21 with arm 17. To face 19 a complementary fitting 23 is adjustably secured to carry the marker rod 24 and, if desired, a cross shaft 25 which is engageable in a clamp 26 to connect the seeder to other apparatus such, for example, as a like seeder.

The marker preferably comprises a short length of chain 27 dangling from collar 28 adjustable longitudinally on rod 24. Such a marker follows ground contours, is readily adjustable to different width of rows, and has little or no tendency to stick or catch during the operation of the seeder. The word chain is used generically to designate any weighted or unweighted, flexible trailing member capable of making a sufficient mark upon the coil during its passage thereover.

While the wheel proper comprises only hub 12, concave disk 11 and rim 10 I provide a complementary annulus 30 which coacts with disk 11 to provide a receptacle for seed. This annulus is provided integrally with arms 31 which are substantially parallel to the axis which extends through the annulus and have outwardly turned extremities 32 riveted or welded to the portion of disk 11 which is immediately adjacent to the rim 10.

It is particularly to be noted that the arms 31 have substantially their entire thickness outside of the margin 33 of annulus 30, as clearly appears in Fig. 5. It will be observed, moreover, that the side margins of each arm 31 are divergent from each other as they leave annulus 30 so that, in the assembled relation of the parts, the spaces between the arms 31 provide tapering slots decreasing in cross section toward the disk portion 11 of the wheel.

Interchangeably mounted on the outside of arms 31 is one of a suitable number of seed elevating rings 34. A separate ring will be provided for each size of seed to be handled by the device. On the inner periphery of each ring are wedge-shaped blocks 35 which are preferably integral with the ring and the side margins of which are adapted to fit closely between the side margins of arms 31 on annulus 30. The thickness of the several blocks corresponds to the thickness of the arms so that the inner face of each block is exactly flush with the inner face of adjacent arms 31 and all openings into the interior of the seed cavity between arms 31 are closed by the blocks when any given ring 34 is positioned on the outside of the arms.

Each block 34 is provided with a bucket 36 for seed opening to the inner face of the block. These buckets may be drilled or pressed into the ring depending on the nature of the material and the size of the seed receiving openings which must be made. Each opening is intended to receive and approximately fit the shape of a single seed of the type which it is desired that the particular ring should handle. Each bucket is preferably so formed that its center line will be inclined rearwardly from a radius of the wheel with respect to the direction of rotation thereof as clearly shown in Fig. 2.

A hopper 38 adapted to receive seed from the several buckets is fixedly supported on shaft 15 by means of a sleeve 39, a pin 40, and an arm 41. The same sleeve carries a second arm 42, the use of which is optional, and which may, when desired, be equipped with spring fingers 43 of which the extremities are adapted to wipe across the mouths of pockets 36 to ensure against the adherence of undesired quantities of seed in any given pocket.

In order to ensure against the loss of seed from the several pockets after they pass a horizontal line through the axle of the wheel in the course of wheel rotation, I provide at 45 a shoe yieldably supported by spring 46 from hopper 38 and positioned by said spring in contact with the interior surface of the seed chamber including the inner face of arms 31 and the inner face of blocks 35 of any particular elevator ring 34 which happens to be in use at the time.

Seed delivered by the buckets of the elevator rings to hopper 38 passes into a discharge pipe 49 which may conveniently be cast integrally with the closure disk 50 for the annulus 30. Pipe 49 and disk 50 are mounted on a sleeve 51, the disk having slots at 52 and 53 which are alternatively engageable with a lug or key 54 projecting outwardly from casting 38. Engagement of the notched periphery of disk 50 with the lug 54 of casting 38 is maintained yieldably by a compression spring 55 releasably maintained under pressure by annular handle 56 having an interior pin 57 engageable with a bayonet slot 58 in shaft 15.

This arrangement permits the handle 56, spring 55, closure disk 50, sleeve 51, discharge pipe 49 and associated parts to be withdrawn bodily when it is desired to change or renew the supply of seed in the interior chamber of the device. If, however, it is merely desired to render the device inoperative for planting purposes during its transportation from one point to another it is possible to grasp handle 60 on disk 50 and slide the parts axially against the compression spring 55 to a degree sufficient to clear lug 54 from slot 52. The pipe 49 and disk 50 may now be rotated on shaft 15 to a position where notch 53 will engage lug 54, thereby maintaining pipe 49 wholly out of registry with the hopper 38 so that any seed elevated in the buckets of ring 34 and discharged into the hopper will merely be returned to the bottom of the seed chamber.

The pipe 49 serves as a support and driving member for plow apparatus which is adjustably mounted thereon and is maintained by lug 54 either in operative position or in an elevated inoperative position according to whether the notch 52 or notch 53 is engaged with said lug.

Pipe 49 terminates close to the ground and just at the rear of the vertical plane which includes the axis of shaft 15. The lower end 61 of pipe 49 is beveled or relieved at its rear. The arrangement is such that regardless of inequalities of ground level the end of pipe 49 and apparatus carried thereby will be maintained at a substantially constant height with reference to the tread or rim portion 10 of the wheel.

Near its lower end pipe 49 is provided with horizontally spaced upright ribs 63 and 64 as shown in Fig. 1 and Fig. 8. Embracing each side of the pipe is a clamping yoke 65 having flanges 66 and a centrally disposed set screw 67. Each clamping yoke supports a plow, the leading plow 68 being a furrowing plow located immediately in advance of the discharge end of pipe 49, and the plow 69 behind the pipe being designed to function as a covering plow for filling the furrow to cover seed deposited therein through pipe 49. The clamping yokes provide convenient means for adjusting the height of the two plows with reference to the path of travel of the wheel to suit any requirements within wide limits.

The operation of the device will be described with a brief summary of the functions of its parts.

The apparatus will first be provided with a seed elevating ring 34 having buckets of a proper size and proper peripheral spacing for the particular seed to be planted. It will, of course, be understood that not every one of the blocks 35 is equipped with a bucket in each instance. The chosen ring 34 is releasably held in place by the spring finger clips 70.

The interior chamber of the wheel is now filled with seed of the character which the selected ring 34 is adapted to handle. This may be done by inserting the seed through the open end of pipe 49, if such pipe is in the elevated or inoperative position in which it is illustrated in dotted lines in Fig. 1. At the option of the operator the filling operation may also be done by removing the handle 56 and spring 55 and withdrawing by means of handle 60 the entire assembly of disk 50, sleeve 51, pipe 49 and the attached plows.

With the pipe 49 and plows 68 and 69 in the elevated position, indicated by dotted lines in Fig. 1, the apparatus is rolled by the operator to the point where the seeding is to be done. During transportation, seed elevated by the buckets of ring 34 and dropped into hopper 38 will be returned by the hopper of the interior chamber of the wheel due to the non-registry of pipe 49 with the hopper in the dotted line position of the pipe.

To prepare the machine for operation the operator pulls handle 60 to free lug 54 from notch 53 whereupon he is able to rotate pipe 49, disk 50 and sleeve 51 upon shaft 15 to bring the receiving end of pipe 49 into registry with the hopper at which time the plows 68 and 69 on the lower end of the pipe will be in position for use. The guide rod 24 is now adjusted to project at either side of fitting 23 with chain 27 trailing from a predetermined point along its length to indicate the position of the next succeeding row.

The operator pushing handle 21 can propel and guide the device with great facility. The extremely close proximity of the plows to the point of engagement of the wheel ring 10 with the earth ensures that the depth and lateral position of the seed will be substantially constant with respect to the path of the wheel regardless of vertical or lateral deflection of handle 21.

As the operator propels the device each of the buckets 36 will successively receive a seed from the material in the interior chamber of the wheel. As the wheel rotates any excess of seeds in a given bucket will be wiped therefrom by spring fingers 43. At an annular position where the seeds might tend to fall from their respective buckets they pass about the resiliently supported arcuate shoe 45 which holds the contents of each bucket until the bucket clears the end of the shoe above hopper 38. Thus, at intervals determined by spacing of buckets 36, individual seeds are dropped into the hopper and discharged through pipe 49 to the ground. Immediately in advance of that pipe plow 68 has opened a furrow and immediately behind the seed the furrow is closed by plow 69.

It will be noted that the device is exceptionally simple and easy to guide and operate due to the fact that its ground wheel serves also as a container for seed. It will be noted further that the ground wheel and associated parts move together to constitute in effect a single moving part. The exterior location of the seed elevator ring 34 greatly facilitates the operation of interchanging rings for different operations of the machine.

While the machine has been described from the point of hand operation its structure may obviously be used with some form of power propulsion.

I claim:

1. A seed planter comprising the combination with an axle and a handle connected therewith, of a wheel having a hopper journaled on said axle, a disk connected with said hopper and a ground rim connected with said disk, an annulus coacting with said disk to provide a storage chamber for seed, buckets accessible to the seed and mounted to rotate with the wheel, and a closure for said annulus adjustably connected therewith and provided with a seed receiving conduit adapted in one position of adjustment of the closure to conduct seeds exteriorly of said chamber from the respective buckets and in another position of adjustment of said closure to permit the seeds elevated by the buckets to fall back into the chamber.

2. A seed planter comprising the combination with an axle and a handle connected therewith, of a wheel having a hopper journaled on said axle, a disk connected with said hopper and a ground rim connected with said disk, an annulus coacting with said disk to provide a storage chamber for seed, a bucket ring having seed receiving recesses communicating with the interior of said chamber, a closure for said annulus mounted on said axle and provided with clutch means adapted to maintain it in either of two positions, a spring releasably maintaining the clutch in engagement, a discharge conduit mounted on said closure and having its interior and exterior position fixed thereby, said conduit being adapted in one position to receive seeds from said buckets and in another position to deflect said seeds, and plow means carried by said conduit and adapted in its seed receiving position to maintain operative engagement with the soil and in its deflecting position to maintain an elevated location.

3. A seed planter comprising the combination with an axle and a handle connected therewith, of a wheel having a hub journaled on said axle, a disk connected with said hub and a ground rim connected with said disk, an annulus coacting with said disk to provide a storage chamber for seed, a hopper within the seed chamber, a ring provided with buckets communicating with the seed chamber and movable about the hopper for the elevation and discharge of seeds into the hopper, means fixedly supporting the hopper from the axle, and a closure for the annulus adjustable about the axle and provided with a conduit adapted in only one position of said closure to register with said hopper to receive seeds therefrom.

4. A seed planter comprising the combination with an axle and a handle connected therewith, of a wheel having a hub journaled on said axle, a disk connected with said hub and a ground rim connected with said disk, an annulus coacting with said disk to provide a storage chamber for seed, a hopper within the seed chamber, a ring provided with buckets communicating with the seed chamber and movable about the hopper for the elevation and discharge of seeds into the hopper, means fixedly supporting the hopper from the axle, and a closure for the annulus adjustable about the axle and provided with a conduit adapted in only one position of said closure to register with said hopper to receive seeds therefrom, said conduit comprising a pipe extending to the earth close to the path of the rim of the wheel and provided with furrowing and covering means at its front and rear sides.

5. The combination with a rotatable seed chamber and an elevator ring provided with buckets accessible to the seed in said chamber, of a shoe coacting with a portion of said ring in an upper portion of its path of movement and adapted to maintain seed in the respective buckets, and a discharge hopper within said chamber positioned immediately beyond said shoe to catch seed discharged from the buckets after passing the shoe.

6. In a seed planter the combination with a rotatable seed chamber provided with peripheral openings, of a ring releasably mounted exteriorly of said chamber and provided with recessed portions registering with said openings.

7. In a seed planter the combination with a rotatable seed chamber provided with peripheral openings, of a ring releasably mounted exteriorly of said chamber and provided with recessed portions registering with said openings, each such portion projecting into its respective opening to a position substantially flush with the interior of the chamber.

8. In a seed planter the combination with a rotatably mounted seed chamber provided with peripheral openings, of a ring encircling said chamber and provided with closure portions fitting within said openings and flush with the interior of the chamber, buckets communicating with the interior of the chamber through selected closure portions of said ring, and a hopper within the chamber adapted to receive seed elevated by said buckets.

9. In a seed planter the combination with a rotatably mounted seed chamber provided with peripheral openings, of a ring encircling said chamber and provided with closure portions fitting within said openings and flush with the interior of the chamber, buckets communicating with the interior of the chamber through selected closure portions of said ring, and a hopper within the chamber adapted to receive seed elevated by said buckets, together with a shoe wiping the interior surface of the chamber in an upper portion of the path of movement of said buckets as they approach the hopper.

10. In a seed planter the combination with a rotatably mounted seed chamber provided with peripheral openings, of a ring encircling said chamber and provided with closure portions fitting within said openings and flush with the interior of the chamber, buckets communicating with the interior of the chamber through selected closure portions of said ring, and a hopper within the chamber adapted to receive seed elevated by said buckets, said hopper being provided with a discharge conduit extending to the outside of the chamber and over which said ring is removable.

11. In a seed planter the combination with a rotatable chamber one side of which constitutes an annulus connected by spaced arms to the other side of the chamber, of a closure for said annulus having a conduit pipe for the discharge of seeds from the chamber, and an elevator ring for lifting seeds from the bottom of said chamber for delivery to said pipe, said ring being receivable outside of said arms about said annulus and provided with blocks fitting between said arms, some of which have bucket recesses.

12. In a seed planter the combination with a rotatable chamber one side of which constitutes an annulus connected by spaced arms to the other side of the chamber of a closure for said annulus having a conduit pipe for the discharge of seeds from the chamber, and an elevator ring for lifting seeds from the bottom of said chamber for delivery to said pipe, said ring being receivable outside of said arms about said annulus and provided with blocks fitting between said arms, some of which have bucket recesses, the inner face of said blocks being substantially flush with the inner surfaces of said arms.

13. In a seed planter the combination with a rotatable chamber one side of which constitutes an annulus connected by spaced arms to the other side of the chamber, of a closure for said annulus having a conduit pipe for the discharge of seeds from the chamber, and an elevator ring for lifting seeds from the bottom of said chamber for delivery to said pipe, said ring being receivable outside of said arms about said annulus and provided with blocks fitting between said arms, some of which have bucket recesses, the inner face of said blocks being substantially flush with the inner surfaces of said arms, an axle for said chamber provided with guiding means adapted to maintain said axle against rotation, and a fixed hopper mounted on said axle and provided with a shoe wiping the inner surfaces of said blocks and arms and registering with said conduit.

14. A seed planter comprising the combination with a rotatable seed chamber having buckets for elevating seed therein, of a hopper for receiving the elevated seed from the buckets, a pipe communicating with the hopper, and a furrowing plow mounted upon said pipe.

15. A seed planter comprising the combination with a rotatable seed chamber having buckets for elevating seed therein, of a hopper for receiving the elevated seed from the buckets, a pipe communicating with the hopper, and a furrowing plow mounted upon said pipe, said pipe being ribbed and said plow being provided with a yoke fitting adjustably clamped on the pipe in engagement with a rib thereof.

16. A seed planter comprising the combination with a rotatable seed chamber having buckets for elevating seed therein, of a hopper for receiving the elevated seed from the buckets, a pipe communicating with the hopper a furrowing plow mounted upon said pipe, and a cover plow likewise mounted upon said pipe.

17. A seed planter comprising the combination with a ground wheel containing a seed chamber and provided with means for delivering seed from the chamber during the rotation of the wheel, of an exle for the wheel provided with a rearwardly extending arm, a handle directly behind the wheel connected with the arm, and a fitting connected with the arm providing a marked support and clamp, said clamp being adapted to provide for the attachment of an additional wheel in parallel to said first mentioned wheel.

18. A seed planter comprising a ground wheel, a handle, a shaft supported at one end by said handle, a seed chamber secured to the wheel and rotatable on said shaft, said chamber having a plurality of apertures disposed in an annular path about the chamber, and a removable bucket ring disposed exterior of the seed chamber and having bucket portions closing said apertures, said ring being removable from the side of said chamber at the unsupported end of the shaft, whereby the bucket ring may be interchanged with another without disturbing other portions of planter mechanism.

19. In a seed planter, a rotatable seed chamber having seed receiving buckets within its walls, a hopper within the chamber, and a shoe upon the inner wall of the chamber adapted to retain seed in said buckets until such buckets reach a position above the hopper.

20. In a seed planter, a rotatable seed chamber having seed receiving buckets within its walls, a hopper within the chamber, a shoe upon the inner wall of the chamber adapted to retain seed in said buckets until such buckets reach a position above the hopper, and means resiliently supporting the shoe from said hopper.

HENRY F. CRANDALL.